US010973069B2

(12) United States Patent
Byun et al.

(10) Patent No.: US 10,973,069 B2
(45) Date of Patent: Apr. 6, 2021

(54) METHOD AND APPARATUS FOR KEEPING DC CONFIGURATION

(71) Applicant: LG Electronics Inc., Seoul (KR)

(72) Inventors: Bokyung Byun, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/635,933

(22) PCT Filed: Aug. 7, 2018

(86) PCT No.: PCT/KR2018/008992
§ 371 (c)(1),
(2) Date: Jan. 31, 2020

(87) PCT Pub. No.: WO2019/031827
PCT Pub. Date: Feb. 14, 2019

(65) Prior Publication Data
US 2020/0245388 A1 Jul. 30, 2020

Related U.S. Application Data

(60) Provisional application No. 62/541,790, filed on Aug. 7, 2017.

(51) Int. Cl.
*H04W 76/15* (2018.01)
*H04W 76/27* (2018.01)
(52) U.S. Cl.
CPC ........... *H04W 76/15* (2018.02); *H04W 76/27* (2018.02)

(58) Field of Classification Search
CPC ..... H04W 36/08; H04W 48/20; H04W 76/15; H04W 76/27
See application file for complete search history.

(56) References Cited

U.S. PATENT DOCUMENTS

2016/0212753 A1\* 7/2016 Wu ..................... H04W 72/085
2016/0242193 A1 8/2016 Hong et al.
(Continued)

FOREIGN PATENT DOCUMENTS

WO WO2015046787 4/2015
WO WO2015064972 5/2015

OTHER PUBLICATIONS

Huawei, HiSilicon, "Draft text proposal on physical layer support of dual connectivity," R1-133839, 3GPP TSG RAN WG1 Meeting #74, Barcelona, Spain, dated Aug. 19-23, 2013, 4 pages.
(Continued)

*Primary Examiner* — Melanie Jagannathan
(74) *Attorney, Agent, or Firm* — Fish & Richardson P.C.

(57) ABSTRACT

Provided are a method for keeping, by a user equipment (UE), a first dual connectivity (DC) configuration in a wireless communication system. The method may include: receiving information for validation of a DC configuration, from a network, wherein the DC configuration includes the first DC configuration and a second DC configuration; determining whether or not the first DC configuration is valid in a radio resource control (RRC) resume procedure, based on the information for validation of DC configuration; if the first DC configuration is valid, keeping the first DC configuration in an RRC resume procedure; and releasing the second DC configuration before initiating the RRC resume procedure.

20 Claims, 13 Drawing Sheets

(56) References Cited

U.S. PATENT DOCUMENTS

| | | | |
|---|---|---|---|
| 2016/0330693 A1 | 11/2016 | Hwang et al. | |
| 2017/0181216 A1* | 6/2017 | Worrall | H04W 76/19 |
| 2018/0270682 A1* | 9/2018 | Zacharias | H04W 74/0833 |
| 2018/0279218 A1* | 9/2018 | Park | H04W 36/08 |
| 2019/0037498 A1* | 1/2019 | Tseng | H04W 72/0413 |
| 2019/0037634 A1* | 1/2019 | Kadiri | H04W 12/003 |
| 2020/0107390 A1* | 4/2020 | Hwang | H04W 76/15 |

OTHER PUBLICATIONS

3rd Generation Partnership Project; Technical Specification Group Radio Access Network, "Evolved Universal Terrestrial Radio Access (E-UTRA); User Equipment (UE) procedures in idle mode (Release 14)", 3GPP TS 36.304 V14.1.0, Dec. 2016, 13 pages.

Huawei, HiSilicon, "Draft text proposal on physical layer support of dual connectivity", R1-133839, 3GPP TSG RAN WG1 Meeting #74, Barcelona, Spain, Aug. 19-23, 2013, 4 pages.

* cited by examiner

METHOD AND APPARATUS FOR KEEPING DC CONFIGURATION

CROSS-REFERENCE TO RELATED APPLICATIONS

This application is a National Stage application under 35 U.S.C. § 371 of International Application No. PCT/KR2018/008992, filed on Aug. 7, 2018, which claims the benefit of U.S. Provisional Application No. 62/541,790 filed on Aug. 7, 2017. The disclosures of the prior applications are incorporated by reference in their entirety.

BACKGROUND OF THE DISCLOSURE

Field of the Disclosure

The present invention relates to a wireless communication system, and more particularly, to a method for a user equipment (UE) to keep or release a dual connectivity (DC) configuration and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

Meanwhile, it is likely almost UEs except UE in RRC_CONNECTED would stay in RRC_INACTIVE since the design objective of NR is to allow a UE to stay in "always connected". Thus, RRC connection suspension to RRC_INACTIVE with DC configuration may be supported. Basically, a modification of DC configuration due to mobility is performed by the network during RRC_CONNECTED based on the measurement report received from the UE. However, since the UE in RRC_INACTIVE can move without notification to the network within pre-configured RNA, when the UE moves out of coverage of the configured DC cell, e.g. stored SCG cells or SCells in MCG, the stored DC configuration may no longer be valid when the UE attempts to resume the RRC connection. Therefore, if the UE always tries to resume the RRC connection with all stored DC configuration in the UE, it may cause additional reconfiguration of the RRC connection signaling. Thus, a method for the UE configured with DC to handle the DC configuration efficiently when the UE initiates a state transition to RRC_CONNECTED and an apparatus supporting the same need to be proposed.

SUMMARY OF THE DISCLOSURE

One embodiment provides a method for keeping, by a user equipment (UE), a first dual connectivity (DC) configuration in a wireless communication system. The method may include: receiving information for validation of a DC configuration, from a network, wherein the DC configuration includes the first DC configuration and a second DC configuration; determining whether or not the first DC configuration is valid in a radio resource control (RRC) resume procedure, based on the information for validation of DC configuration; if the first DC configuration is valid, keeping the first DC configuration in an RRC resume procedure; and releasing the second DC configuration before initiating the RRC resume procedure.

Another embodiment provides a user equipment (UE) keeping a first dual connectivity (DC) configuration in a wireless communication system. The UE may include: a memory; a transceiver; and a processor, connected to the memory and the transceiver, that: controls the transceiver to receive information for validation of a DC configuration, from a network, wherein the DC configuration includes the first DC configuration and a second DC configuration; determines whether or not the first DC configuration is valid in a radio resource control (RRC) resume procedure, based on the information for validation of DC configuration; if the first DC configuration is valid, keeps the first DC configuration in an RRC resume procedure; and releases the second DC configuration before initiating the RRC resume procedure.

Unnecessary signaling for deleting valid DC configuration may not be occur.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
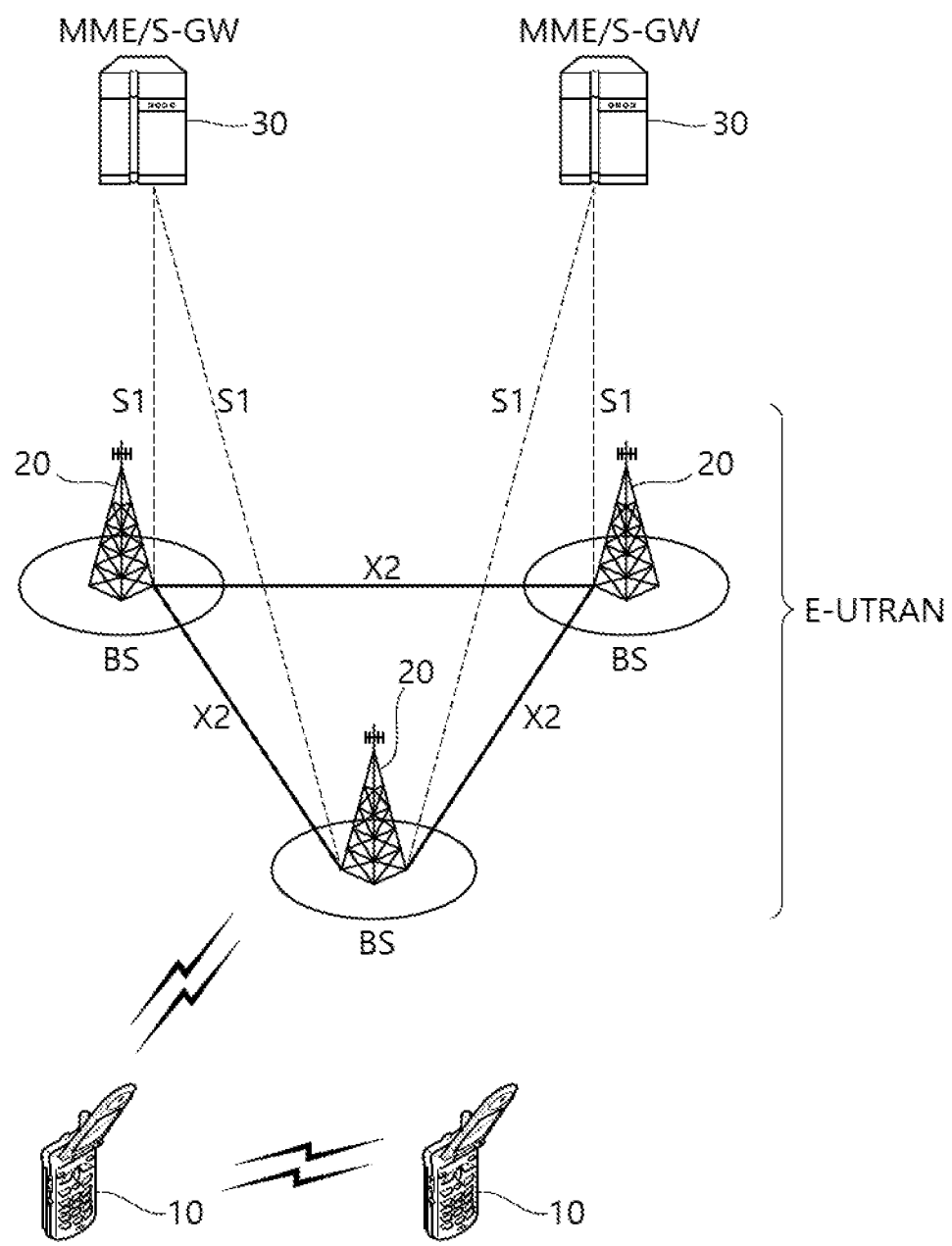
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
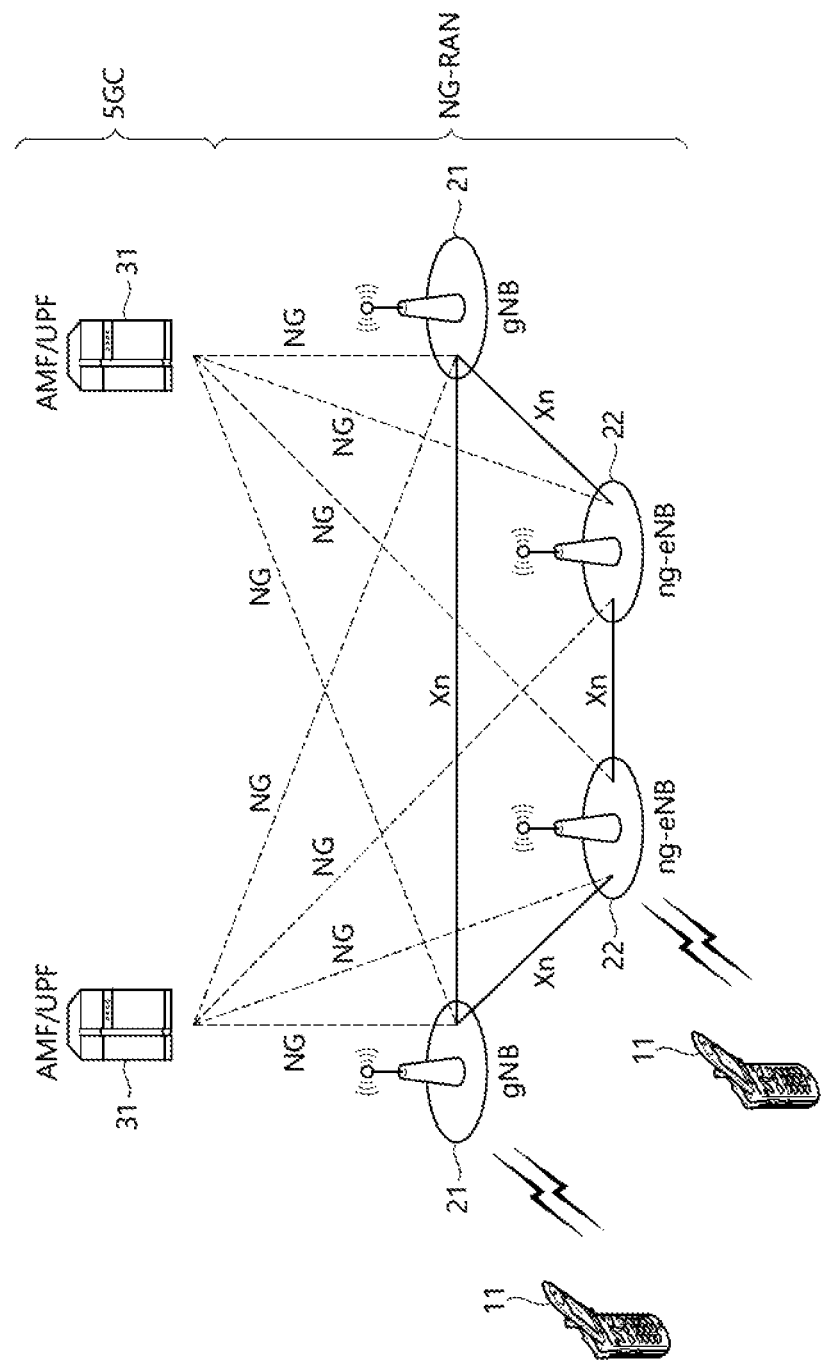
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
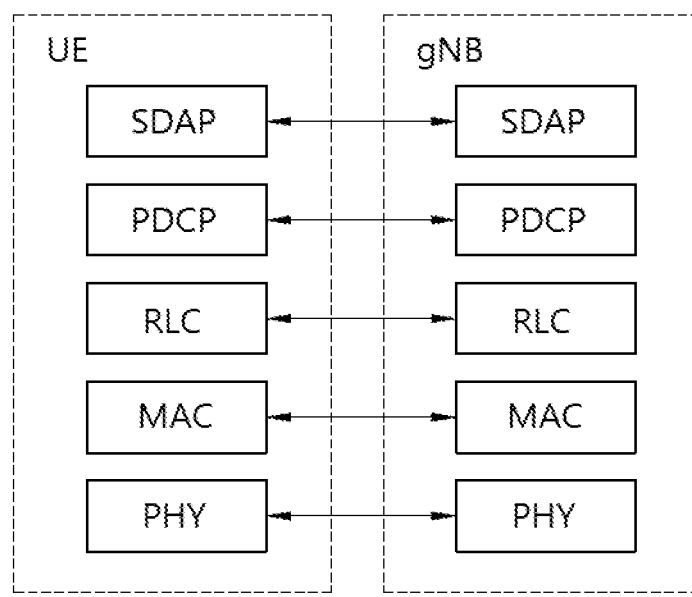
FIG. 3 shows a block diagram of a user plane protocol stack to which technical features of the present invention can be applied.
Figure 4:
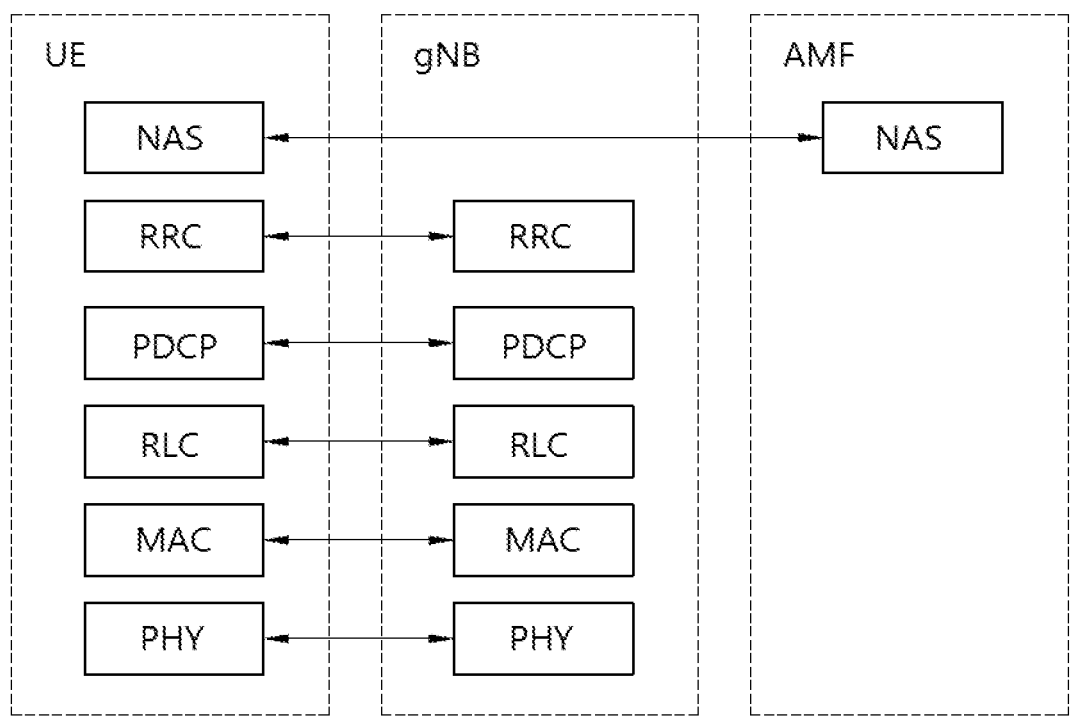
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARM), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
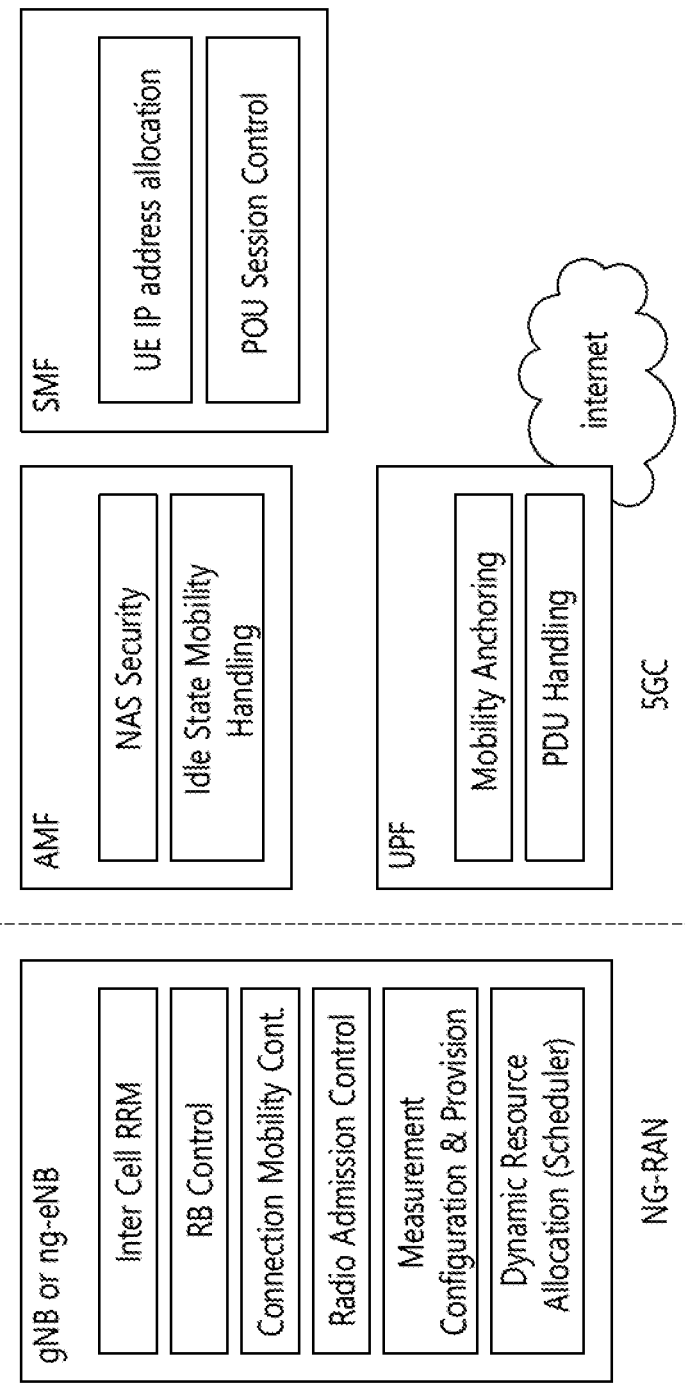
FIG. 5 shows functional split between NG-RAN and 5GC to which technical features of the present invention can be applied.

FIG. 5 shows functional split between NG-RAN and 5GC to which technical features of the present invention can be applied.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or O&M);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) may host the following main functions:
NAS signalling termination;
NAS signalling security;
AS Security control;
Inter CN node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
SMF selection.

The User Plane Function (UPF) may host the following main functions:
Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

The Session Management function (SMF) may host the following main functions:
Session Management;
UE IP address allocation and management;
Selection and control of UP function;
Configures traffic steering at UPF to route traffic to proper destination;
Control part of policy enforcement and QoS;
Downlink Data Notification.

Hereinafter, Multi-RAT Dual Connectivity (MR-DC) is described.

NG-RAN may support MR-DC operation whereby a UE in RRC_CONNECTED is configured to utilize radio resources provided by two distinct schedulers, located in two different NG-RAN nodes connected via a non-ideal backhaul and providing either E-UTRA (i.e. if the node is an ng-eNB) or NR access (i.e. if the node is a gNB). One node may act as the master node (MN) and the other as the secondary node (SN). The MN and SN may be connected via a network interface and at least the MN is connected to the core network.

Figure 6:
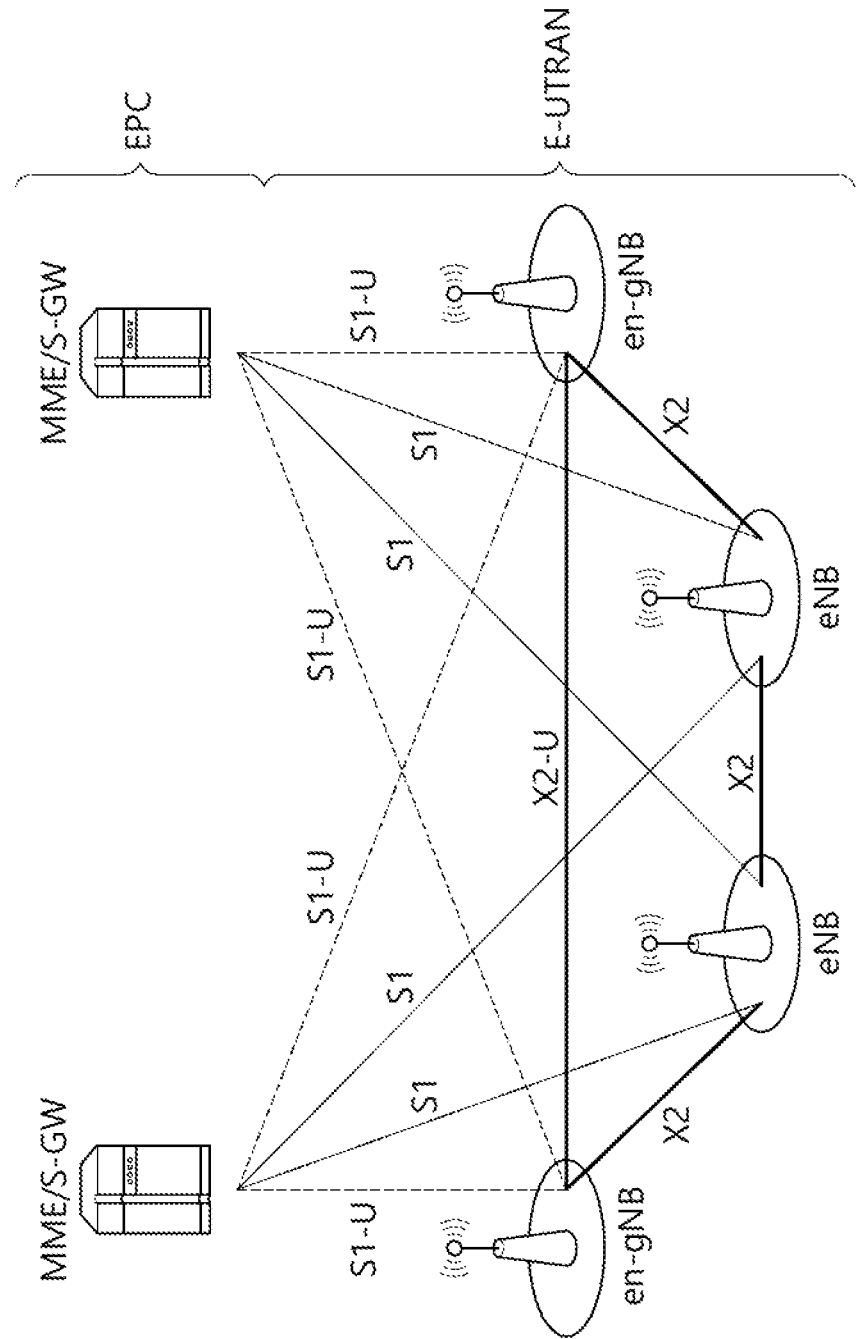
FIG. 6 shows architecture of MR-DC with the EPC to which technical features of the present invention can be applied.

FIG. 6 shows architecture of MR-DC with the EPC to which technical features of the present invention can be applied.

E-UTRAN may support MR-DC via E-UTRA-NR Dual Connectivity (EN-DC), in which a UE is connected to one eNB that acts as a MN and one en-gNB that acts as a SN. The eNB may be connected to the EPC via the S1 interface and to the en-gNB via the X2 interface. The en-gNB may also be connected to the EPC via the S1-U interface and other en-gNBs via the X2-U interface.

Furthermore, NG-RAN may support NG-RAN E-UTRA-NR Dual Connectivity (NGEN-DC), in which a UE is connected to one ng-eNB that acts as a MN and one gNB that acts as a SN. The ng-eNB is connected to the 5GC and the gNB is connected to the ng-eNB via the Xn interface. Furthermore, NG-RAN may support NR-E-UTRA Dual Connectivity (NE-DC), in which a UE is connected to one gNB that acts as a MN and one ng-eNB that acts as a SN. The gNB is connected to 5GC and the ng-eNB is connected to the gNB via the Xn interface.

In the dual connectivity, a set of serving cells may be newly defined below. A master cell group (MCG) may refer to a set of serving cells controlled by the macro BS (e.g. master eNB, master gNB, MeNB or MgNB) which is a BS controlling a primary cell (PCell), and a secondary cell group (SCG) may refer to a set of serving cells controlled by a secondary BS (e.g. secondary eNB, secondary gNB, SeNB or SgNB) which is not a BS controlling the PCell.

Hereinafter, RRC inactive state is described.

RRC_INACTIVE is a state where a UE remains in connection management (CM)-CONNECTED and can move within an area configured by NG-RAN without notifying NG-RAN. In RRC_INACTIVE, the last serving gNB node keeps the UE context and the UE-associated NG connection with the serving AMF and UPF.

If the last serving gNB receives DL data from the UPF or DL signalling from the AMF (except the UE Release Command and Reset messages) while the UE is in RRC_INACTIVE, it pages in the cells corresponding to the RAN-based Notification Area (RNA) and may send XnAP RAN Paging to neighbour gNB(s) if the RNA includes cells of neighbour gNB(s).

If the last serving NG-RAN node receives the UE Release Command message from the AMF while the UE is in RRC_INACTIVE, it shall reply with the UE Context Release Complete message.

The AMF provides to the NG-RAN node the RRC Inactive Assistant Information to assist the NG-RAN node's decision whether the UE can be sent to RRC_INACTIVE. The RRC Inactive Assistant Information includes the registration area configured for the UE, the UE specific DRX, Periodic Registration Update timer, an indication if the UE is configured with Mobile Initiated Connection Only (MICO) mode by the AMF, and UE Identity Index value. The UE registration area is taken into account by the NG-RAN node when configuring the RAN-based notification area. The UE specific DRX and UE Identity Index value are used by the NG-RAN node for RAN paging. The Periodic Registration Update timer is taken into account by the NG-RAN node to configure Periodic RAN Notification Area Update timer.

At transition to RRC_INACTIVE the NG-RAN node may configure the UE with a periodic RNA Update timer value.

If the UE accesses a gNB other than the last serving gNB, the receiving gNB triggers the XnAP Retrieve UE Context procedure to get the UE context from the last serving gNB and may also trigger a Data Forwarding procedure including tunnel information for potential recovery of data from the last serving gNB. Upon successful UE context retrieval, the receiving gNB shall perform the slice-aware admission control in case of receiving slice information and becomes the serving gNB and it further triggers the NGAP Path Switch Request procedure. After the path switch procedure, the serving gNB triggers release of the UE context at the last serving gNB by means of the XnAP UE Context Release procedure.

In case the UE is not reachable at the last serving gNB, the gNB shall fail AMF initiated UE-associated class 1 procedures if any, and shall trigger the NAS Non Delivery Indication procedure to report the non-delivery of any NAS PDUs received from the AMF for the UE.

If the UE accesses a gNB other than the last serving gNB and the receiving gNB does not find a valid UE Context, gNB performs establishment of a new RRC connection instead of resumption of the previous RRC connection.

A UE in the RRC_INACTIVE state is required to initiate RNA update procedure when it moves out of the configured RNA. When receiving RNA update request from the UE, the receiving gNB triggers the XnAP Retrieve UE Context procedure to get the UE context from the last serving gNB and may decide to send the UE back to RRC_INACTIVE state, move the UE into RRC_CONNECTED state, or send the UE to RRC_IDLE.

Figure 7:
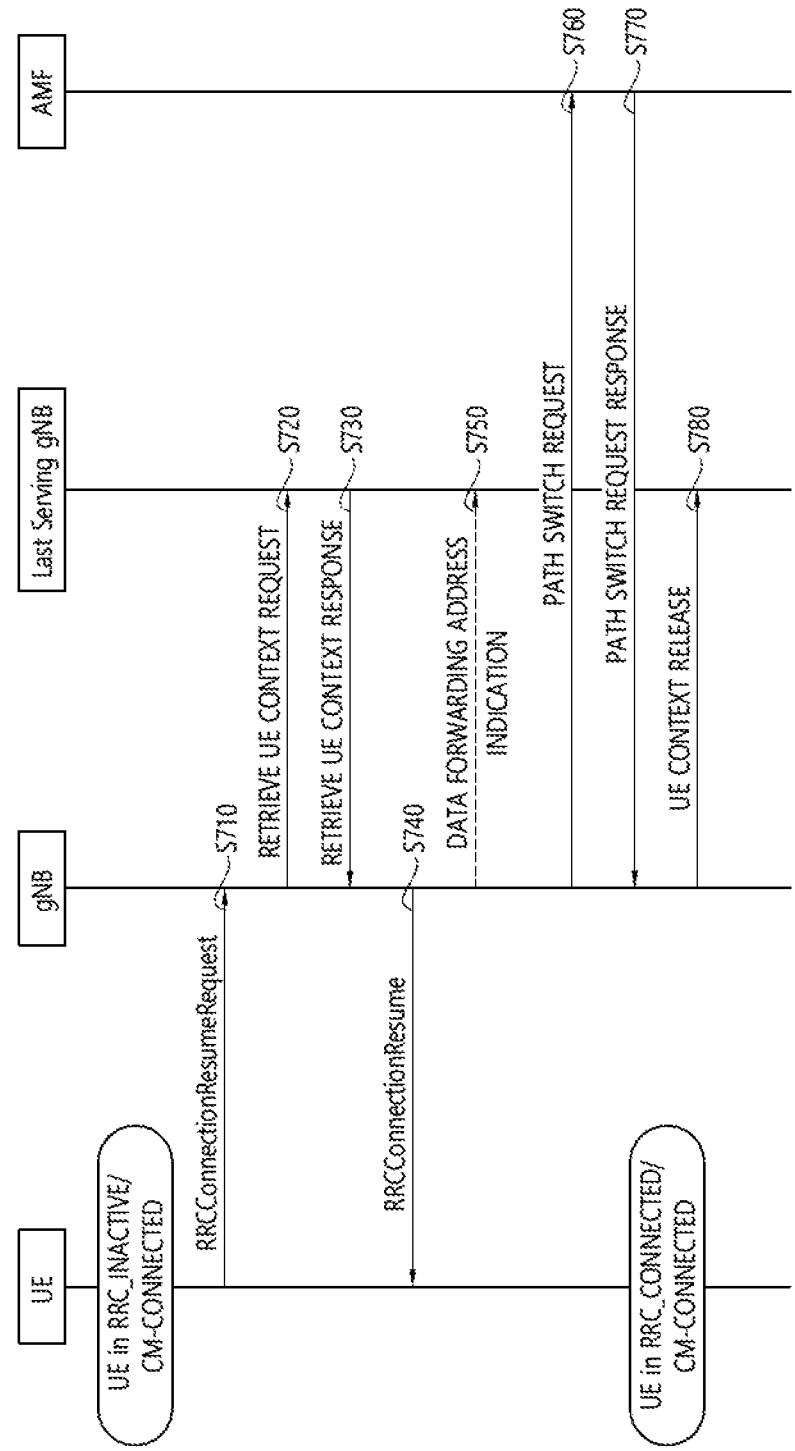
FIG. 7 shows a RRC state transition procedure triggered by a UE to which technical features of the present invention can be applied.

FIG. 7 shows a RRC state transition procedure triggered by a UE to which technical features of the present invention can be applied.

Referring to FIG. 7, in step S710, the UE resumes from RRC_INACTIVE, providing the Inactive RNTI (I-RNTI), allocated by the last serving gNB.

In step S720, the gNB, if able to resolve the gNB identity contained in the I-RNTI, requests the last serving gNB to provide UE Context data.

In step S730, the last serving gNB provides UE context data.

In step S740, the gNB completes the resumption of the RRC connection.

In step S750, if loss of DL user data buffered in the last serving gNB shall be prevented, the gNB provides forwarding addresses.

In step S760 and S770, the gNB performs path switch.

In step S780, the gNB triggers the release of the UE resources at the last serving gNB.

After step S710, when the gNB decides to reject the Resume Request and keep the UE in RRC_INACTIVE without any reconfiguration, or when the gNB decides to setup a new RRC connection, SRB0 (without security) can be used. When the gNB decides to reconfigure the UE (e.g. with a new DRX cycle or RNA) or when the gNB decides to push the UE to RRC_IDLE, SRB1 (with at least integrity protection) shall be used. SRB1 can only be used once the UE Context is retrieved i.e. after step S730.

Figure 8:
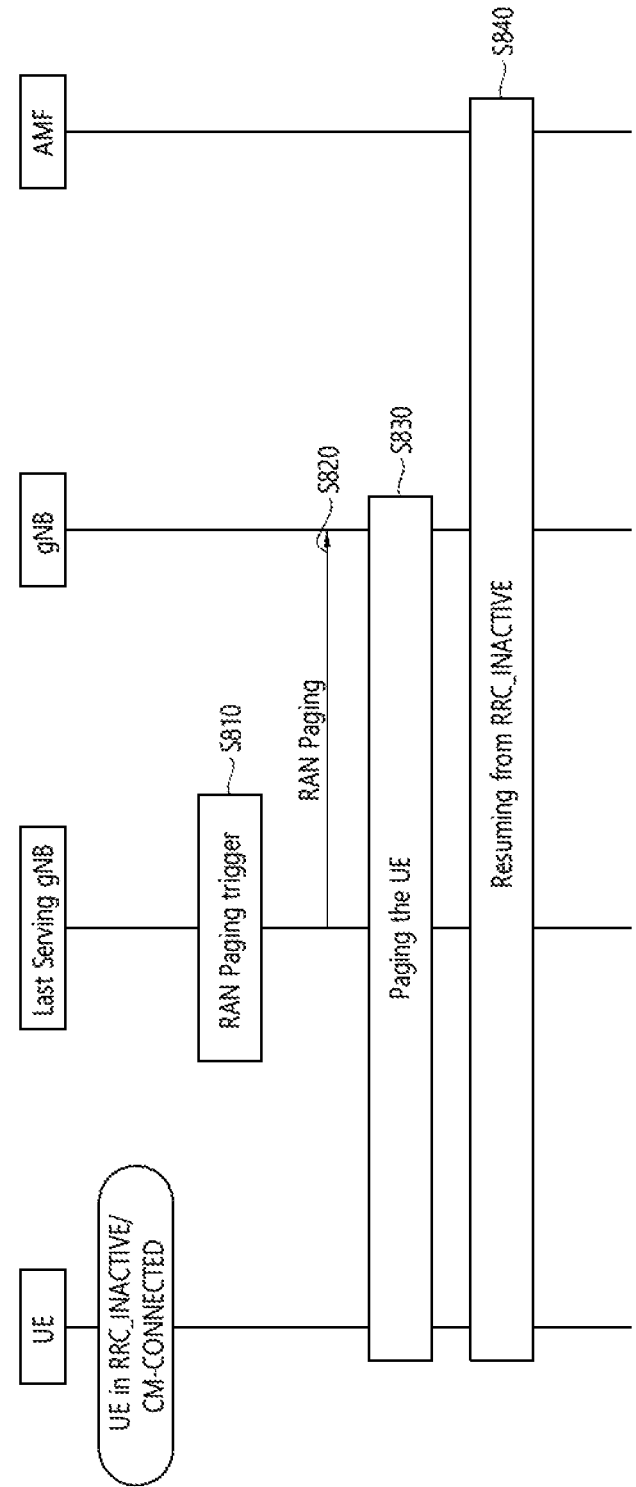
FIG. 8 shows a RRC state transition procedure triggered by a network to which technical features of the present invention can be applied.

FIG. 8 shows a RRC state transition procedure triggered by a network to which technical features of the present invention can be applied.

Referring to FIG. 8, in step S810, a RAN paging trigger event occurs (incoming DL user plane, DL signaling from 5GC, etc.).

In step S820, RAN paging is triggered; either only in the cells controlled by the last serving gNB or also by means of Xn RAN Paging in cells controlled by other gNBs, configured to the UE in the RNA.

In step S830, the UE is paged with the I-RNTI.

In step S840, if the UE has been successfully reached, it attempts to resume from RRC_INACTIVE, as described in FIG. 7.

Meanwhile, considering that initial NR deployment could be like small cell in LTE, most UEs are likely to be configured with DC while in RRC_CONNECTED. In addition, since the design objective of NR is to allow a UE to stay in "always connected", it is likely almost UEs except UE in RRC_CONNECTED would stay in RRC_INACTIVE. Thus, RRC connection suspension to RRC_INACTIVE with DC configuration may be supported.

Basically, a modification of DC configuration due to mobility is performed by the network during RRC_CONNECTED based on the measurement report received from the UE. However, since the UE in RRC_INACTIVE can move without notification to the network within pre-configured RNA, when the UE moves out of coverage of the configured DC cell, e.g. stored SCG cells or SCells in MCG, the stored DC configuration may no longer be valid when the UE attempts to resume the RRC connection. Therefore, if the UE always tries to resume the RRC connection with all stored DC configuration in the UE, it may cause additional reconfiguration of the RRC connection signaling. Thus, a method for the UE configured with DC to handle the DC configuration efficiently when the UE initiates a state transition to RRC_CONNECTED and an apparatus supporting the same need to be proposed.

Hereinafter, a method for a UE to resume the DC configuration selectively and an apparatus supporting the same according to an embodiment of the present invention are described in detail. In the specification, RRC_INACTIVE may be referred to as inactive condition, lightweight connection in LTE, a suspended state or lightweight connection in eLTE. The RAN node may be at least one of gNB in NR, eNB in LTE or eNB in eLTE. In addition, the master BS and the secondary BS configured with DC may have at least one of combination of NR and NR, E-UTRAN and E-UTRAN, NR and E-UTRAN or E-UTRAN and NR.

According to an embodiment of the present invention, each of the DC configurations may be resumed selectively while the UE is in RRC_INACTIVE. It is assumed that the UE may be configured with DC and transit to RRC_INACTIVE while keeping the DC configuration in the following method.

A selective resumption of DC configuration may be one of the following types:

Type A: a resumption of the entire DC configuration
Type B: a resumption of the MCG configuration (e.g. selective resuming of entire MCG configuration, or selective resuming for each SCells in the MCG)
Type C: a resumption of the SCG configuration (e.g. selective resuming of entire SCG configuration, or selective resuming for each cells in the SCG)

To support above selective resumption of the DC configuration while the UE is in inactive condition, the UE may receive a specific criteria from the network for validity check of each of DC configurations (e.g. the entire DC configuration, the entire or respective SCells in the MCG or the entire or respective cells in the SCG). If the specific criteria is met, the UE may consider that each of DC configuration valid.

Figure 9:
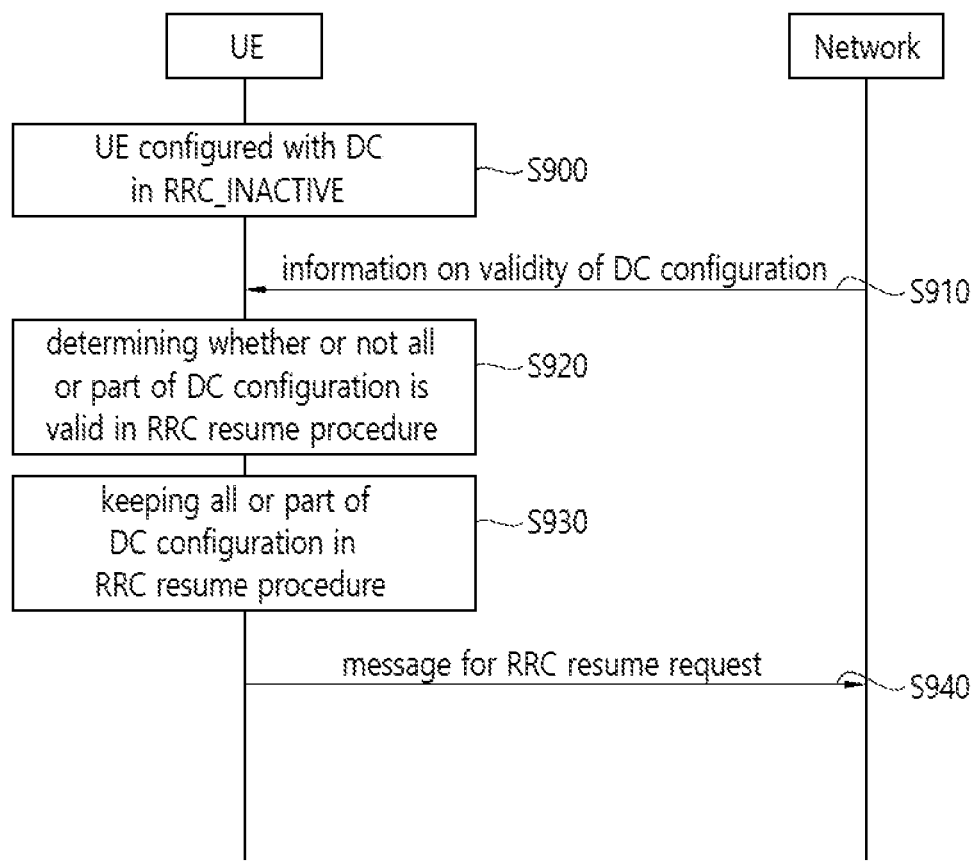
FIG. 9 shows a procedure for selective resumption of the DC configuration according to an embodiment of the present invention.

FIG. 9 shows a procedure for selective resumption of the DC configuration according to an embodiment of the present invention.

Referring to FIG. 9, in step S900, the UE may be configured with DC. Further, the UE may enter RRC_INACTIVE state.

In step S910, the UE may receive information for validation of the DC configuration from a network. The network may be referred to as a RAN node. The RAN node may be a master BS or a secondary BS. The information for validation of the DC configuration may be a specific criteria for validity check of each of the DC configurations. For example, the information for validation of the DC configuration may be a specific criteria for validity check of the entire DC configuration. For example, the information for validation of the DC configuration may be a specific criteria for validity check of the entire SCell in the MCG. For example, the information for validation of the DC configuration may be a specific criteria for validity check of respective SCells in the MCG. For example, the information for validation of the DC configuration may be a specific criteria for validity check of the entire cell in the SCG. For example, the information for validation of the DC configuration may be a specific criteria for validity check of respective cells in the SCG.

When the UE configured with DC receives a command for state transition to the inactive condition, the UE may receive the information for validation of the DC configuration (e.g. specific criteria) via dedicated signaling. While the UE is in the inactive condition, the UE may receive the information for validation of the DC configuration (e.g. specific criteria) via broadcast (e.g. system information message). The information for validation of the DC configuration (e.g. specific criteria) may be as follows.

Option 1 (the Information for Validation of the DC Configuration may be Validity Area Information)

The RAN node may provide the validity area information in which the each of DC configurations is considered as valid. The validity area information includes a cell. The validity area information includes a list of cells. Additionally, for each of DC configurations, the associated validity area information may be provided. For example, the validity area information associated with each of the DC configurations may be a cell or a list of cells in which the entire DC configuration is valid. For example, the validity area information associated with each of the DC configurations may be a cell or a list of cells in which the entire MCG configuration is valid. For example, the validity area information associated with each of the DC configurations may be a cell or a list of cells in which the entire SCG configuration is valid. For example, the validity area information associated with each of the DC configurations may be a cell or a list of cells in which the each of the SCells in the MCG is valid. For example, the validity area information associated with each of the DC configurations may be a cell or a list of cells in which the each of the cells in the SCG is valid. For example, the validity area information associated with each of the DC configurations may be a cell or a list of cells in which a DC configuration for at least one cell in the MCG or the SCG is valid.

Option 2 (the Information for Validation of the DC Configuration may be Cell Quality Threshold)

The RAN node may provide a specific threshold (e.g. RSRP threshold or RSRQ threshold) with which each of DC configurations is considered as valid. If quality of a cell is greater than or equal to the specific threshold, the DC configuration for the cell may be considered as valid. Optionally, the threshold values may be provided for each of DC configurations so that different threshold values may be applied to different cells and/or different cell groups. The examples of relation between the threshold values and each of DC configurations may be as follows. For example, the specific threshold may be the RSRP threshold for validation of the entire MCG configuration. In this case, only if the cell quality of all the cells in the MCG is greater than or equal to the specific threshold, the UE may consider that the MCG configuration is valid. For example, the specific threshold may be the RSRP threshold per cell for validation of the each of the SCells in the MCG. For example, the specific threshold may be the RSRP threshold for validation of the entire SCG configuration. In this case, only if the cell quality of all the cells in the SCG is greater than or equal to the specific threshold, the UE may consider that the SCG configuration is valid. For example, the specific threshold may be the RSRP threshold per cell for validation of the each of the cells in the SCG.

Option 3 (the Information for Validation of the DC Configuration may be Validity Time Duration)

The RAN node may provide a validity time duration in which the each of DC configurations is considered as valid. Optionally, the validity time and associated DC configuration is provided. The examples of relation between the validity time and associated DC configuration may be as follows. For example, the validity time duration may be time duration during which the entire DC configuration is valid. For example, the validity time duration may be time duration during which the entire MCG configuration is valid. For example, the validity time duration may be time duration during which the entire SCG configuration is valid.

If the UE does not receive the information for validation of the DC configuration (e.g. specific criteria), the UE may use cell reselection criteria used for reselection while in RRC_IDLE. For details on the cell reselection criteria, see 5.2.4 of 3GPP TS 36.304 V14.1.0. According to the cell reselection criteria, the UE may perform cell reselection. If the UE is camped on the cell of the DC configuration, the UE may consider that the cell is valid. Alternatively, if the UE does not receive the information for validation of the DC configuration (e.g. specific criteria), the UE may consider that the entire DC configuration is always valid during the inactive condition.

In step S920, the UE may determine whether or not all or part of the DC configuration is valid in the RRC resume procedure. For example, if the specific criteria is met, the UE may consider that each of DC configurations is valid For option 1, for example, if the UE is in the cell in which the entire DC configuration is valid, the UE may determine the entire DC configuration is valid at the cell in the RRC resume procedure. For example, if the UE is in the cell in which the entire MCG configuration is valid, the UE may determine the entire MCG configuration is valid at the cell in the RRC resume procedure, but the UE may determine the entire SCG configuration is not valid. For example, if the UE is in the cell in which the entire SCG configuration is valid, the UE may determine the entire SCG configuration is valid at the cell in the RRC resume procedure, but the UE may determine the entire MCG configuration is not valid. For example, if the UE is in the cell in which a specific DC configuration is valid, the UE may determine the specific DC configuration is valid at the cell in the RRC resume procedure, but the UE may determine the other DC configuration excluding the specific DC configuration is not valid at the cell in the RRC resume procedure. For example, the specific DC configuration may be DC configurations for each of the SCells in the MCG. For example, the specific DC configuration may be DC configurations for each of the cells in the SCG.

For option 2, for example, if the quality of the cell is greater than or equal to the specific threshold, the UE may determine that the DC configuration for the cell is valid.

For option 3, for example, the UE may determine that the entire DC configuration is valid during the validity time duration. Alternatively, the UE may determine that the entire MCG configuration is valid during the validity time duration. Alternatively, the UE may determine that the entire SCG configuration is valid during the validity time duration.

In step S930, the UE may keep all or part of DC configuration which is considered as valid, in the RRC resume procedure. For example, for option 1, if the UE determines the specific DC configuration is valid at the cell in the RRC resume procedure, the UE may keep the specific DC configuration in the RRC resume procedure. On the other hand, the UE may release all or part of DC configuration which is considered as not valid, before initiating the RRC resume procedure.

In step S940, after keeping or releasing, the UE may transmit a message for RRC resume request. If the each of DC configurations meets the criteria provided by the network, if any, the UE may include an indicator of whether the each of DC configurations is valid based on the criteria in the message used for RRC connection resume (or RRC connection activation). If the each of DC configurations does not meet the criteria provided by the network, if any, the UE may include an indicator of whether the each of DC configurations is not valid based on the criteria in the message used for RRC connection resume (or RRC connection activation). If the each of DC configurations does not meet the criteria provided by the network, if any, the UE may release the each of DC configurations that does not meet the criteria, and include an indicator of whether the each DC configuration is deleted or not in the message used for RRC connection resume (or RRC connection activation). The deleted cells and/or cell group or kept cells and/or cell group may be provided to the network. The RAN node that received the message from the UE may perform secondary node (SN) release or SN modification procedure based on the indicator.

Figure 10A:
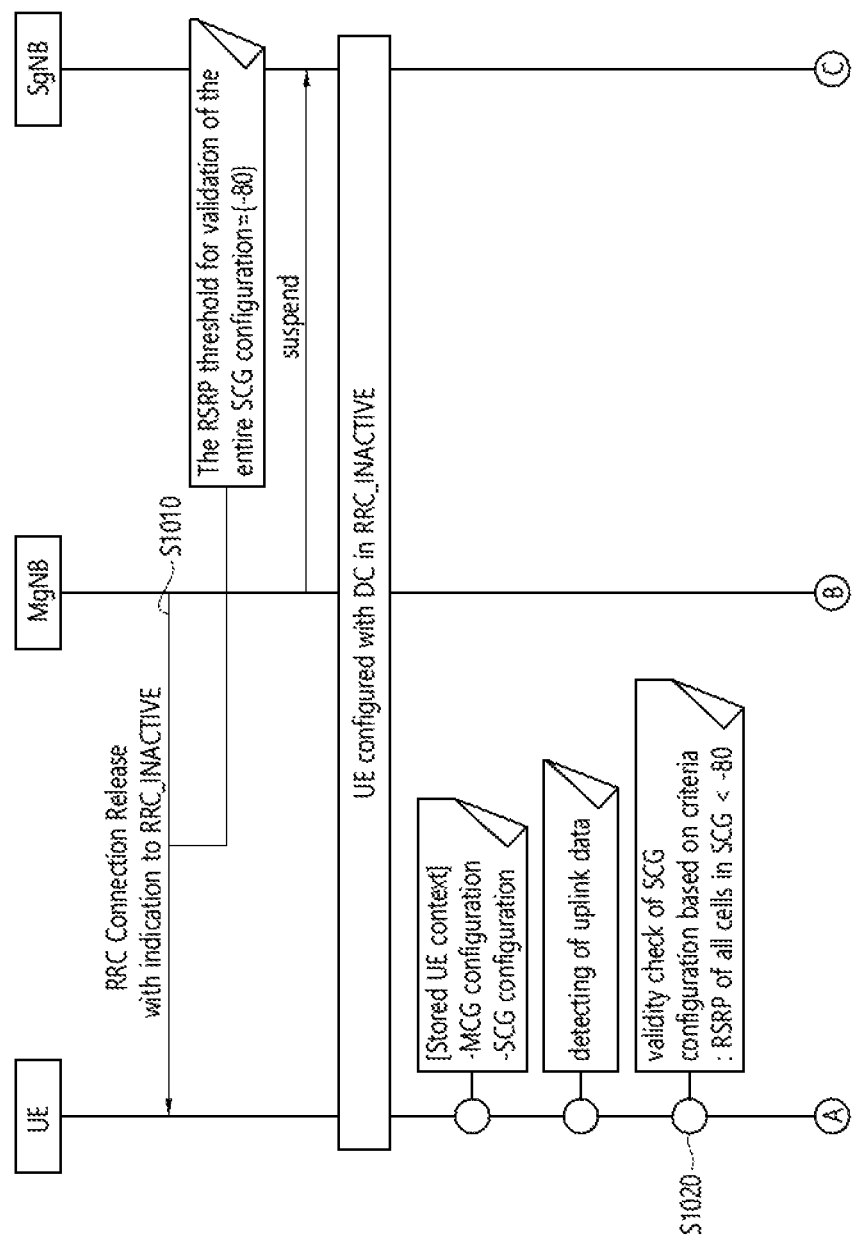
FIGS. 10A and 10B show a procedure for selective resumption of the DC configuration based on the option 2 criteria according to an embodiment of the present invention.
Figure 10B:
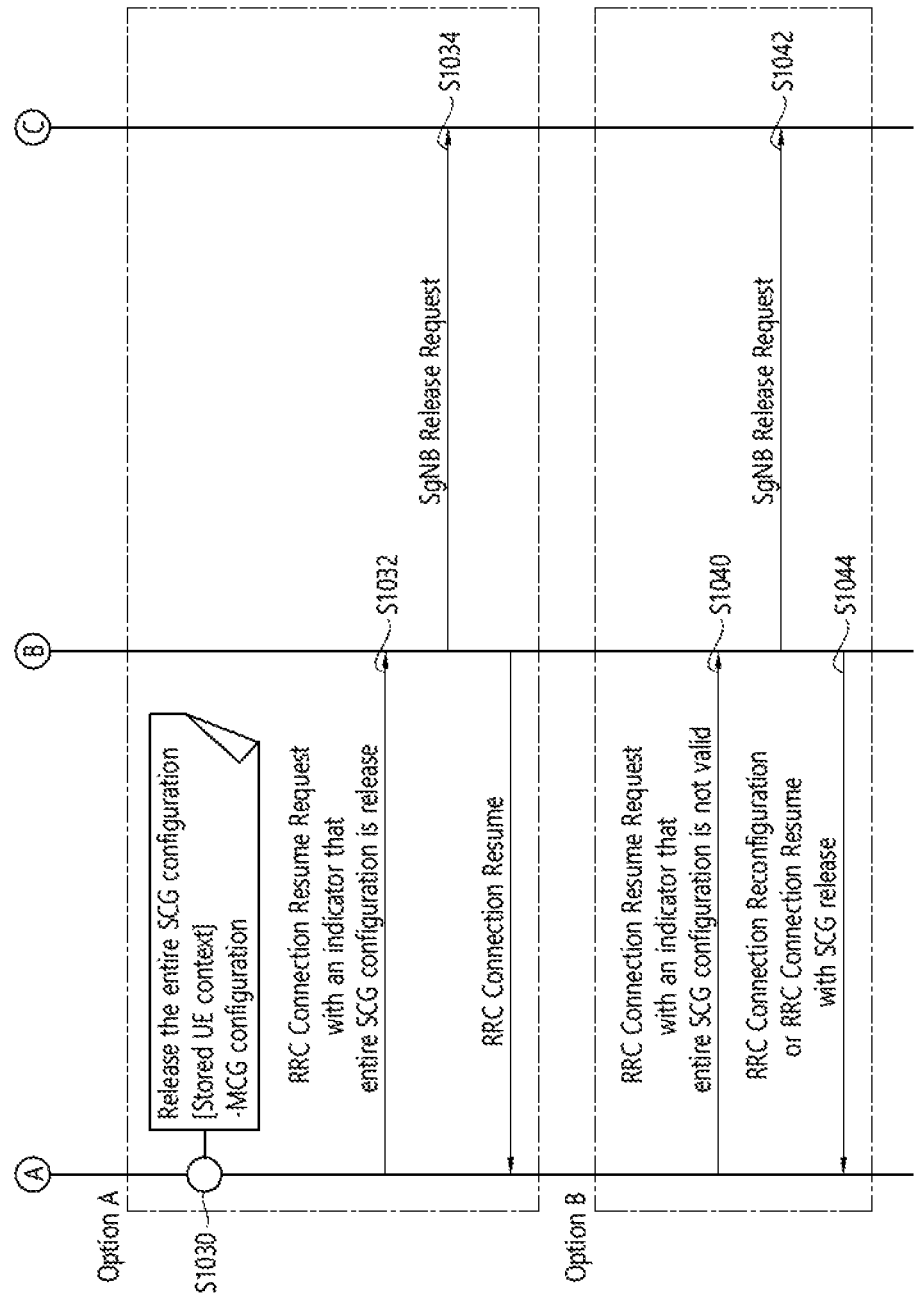

FIGS. 10A and 10B show a procedure for selective resumption of the DC configuration based on the option 2 criteria according to an embodiment of the present invention.

Referring to FIG. 10A, in step S1010, a UE configured with DC may receive a RRC connection release message with indication for state transition to RRC_INACTIVE and the RSRP threshold as −80 for validation of the entire SCG configuration.

In step S1020, when the UE detects uplink data while in RRC_INACTIVE, the UE may perform validity check for the entire SCG configuration based on the RSRP threshold, and may confirm that the RSRP of all cells in SCG are less than −80. Then, the UE may initiate the RRC connection resume procedure from RRC_INACTIVE for mobile originated (MO).

Referring to FIG. 10B, for option A, in step S1030, the UE may release the entire SCG configuration stored in the UE. In step S1032, the UE may initiate transmission of the RRC connection resume request message with the entire SCG configuration discard indicator. In step S1034, the network may perform SgNB releaser procedure based on the entire SCG configuration discard indicator from the UE.

For option B, in step S1040, the UE may initiate transmission of the RRC connection resume request message with an indicator that the entire SCG configuration is not valid. In step S1042, the network may decide whether to release the SgNB or not based on the indicator from the UE. In step S1044, if the network performs SgNB release procedure, the MgNB may indicate in the RRC connection reconfiguration and/or RRC connection resume message towards the UE. Then, the UE shall release the entire SCG configuration.

Figure 11:
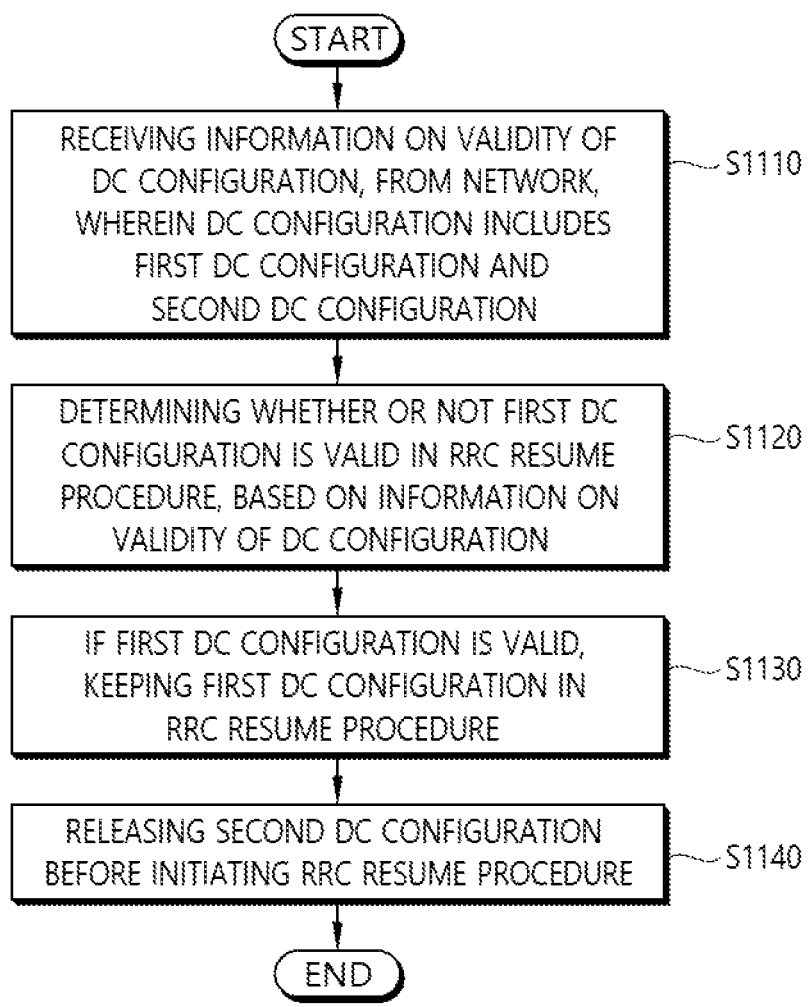
FIG. 11 is a block diagram illustrating a method for a UE to keep a DC configuration according to an embodiment of the present invention.

FIG. 11 is a block diagram illustrating a method for a UE to keep a DC configuration according to an embodiment of the present invention.

Referring to FIG. 11, in step S1110, the UE may receive information for validation of the DC configuration, from a network. The DC configuration may include the first DC configuration and a second DC configuration. The first configuration may be an entire master cell group (MCG) configuration, and the second DC configuration is may be an entire secondary cell group (SCG) configuration. Alternatively, the first DC configuration may be an entire SCG configuration, and the second DC configuration may be an entire MCG configuration. Alternatively, the first DC configuration may be a DC configuration for at least one SCell in a MCG, and the second DC configuration may be other DC configuration excluding the first DC configuration from the DC configuration. Alternatively, the first DC configuration may be a DC configuration for at least one cell in a SCG, and the second DC configuration may be other DC configuration excluding the first DC configuration from the DC configuration.

In step S1120, the UE may determine whether or not the first DC configuration is valid in a RRC resume procedure, based on the information for validation of DC configuration.

The information for validation of the DC configuration may include at least one cell in which the first DC configuration is valid. The first DC configuration may be valid in the RRC resume procedure, if the UE is in the at least one cell in which the first DC configuration is valid.

The information for validation of the DC configuration may include a cell quality threshold in which the first DC configuration is valid. The first DC configuration may be valid in the RRC resume procedure, if quality of the cell to which the UE belongs is greater than or equal to the cell quality threshold. The first DC configuration may be one of an entire MCG configuration, an entire SCG configuration, a DC configuration for at least one SCell in a MCG or a DC configuration for at least one cell in a SCG.

The information for validation of the DC configuration may include a cell quality threshold in which the first DC configuration is valid. The first DC configuration may be an entire MCG configuration, and the cell quality threshold may be for the entire MCG configuration. In case that the first DC configuration is the entire MCG configuration and the cell quality threshold is for the entire MCG configuration, the entire MCG configuration may be valid in the RRC resume procedure, if quality of all cells in a MCG is greater than or equal to the cell quality threshold. Alternatively, the first DC configuration may be an entire SCG configuration, and the cell quality threshold may be for the entire SCG configuration. In case that the first DC configuration is the entire SCG configuration and the cell quality threshold is for the entire SCG configuration, the entire SCG configuration may be valid in the RRC resume procedure, if quality of all cells in a SCG is greater than or equal to the cell quality threshold.

The information for validation of the DC configuration may include a validity time duration in which the DC configuration is valid. The first DC configuration may be valid in the RRC resume procedure, during the validity time duration. The first DC configuration may be one of an entire MCG configuration, an entire SCG configuration, a DC configuration for at least one SCell in a MCG or a DC configuration for at least one cell in a SCG.

In step S1130, the UE may keep the first DC configuration in an RRC resume procedure if the first DC configuration is valid.

In step S1140, the UE may release the second DC configuration before initiating the RRC resume procedure. If the first DC configuration is valid, the UE may keep the first DC configuration in the RRC resume procedure, but the UE may release the second DC configuration before initiating the RRC resume procedure. If the first DC configuration is not valid, the UE may release the first DC configuration and the second DC configuration before initiating the RRC resume procedure.

Further, the UE may transmit a message for RRC resume request including information on whether or not the first DC configuration is kept, to the network. Further, the UE may transmit a message for RRC resume request including information on whether or not the first DC configuration is valid, to the network.

According to an embodiment of the present invention, the UE can keep all or part of DC configuration in the RRC resume procedure based on the information for validation of DC configuration. In case that the UE moves within a coverage of the configured DC cell, the UE can use stored DC configurations for RRC connection resume when the UE attempts to resume the RRC connection, because the stored DC configurations is still valid. Otherwise, in case that the UE moves out of the coverage of the configured DC cell, the UE cannot use stored DC configurations for RRC connection resume when the UE attempts to resume the RRC connection, because the stored DC configurations is not valid. According to an embodiment of the present invention, thus, unnecessary signaling for deleting still valid DC configuration may not be occur.

Figure 12:
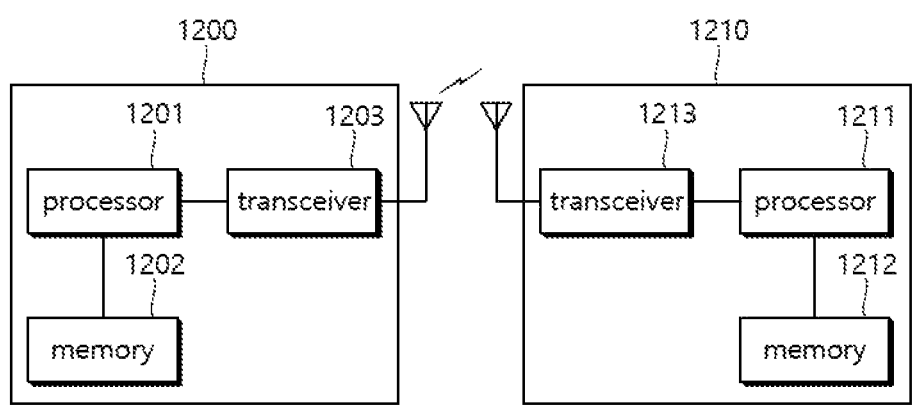
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the user equipment may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for keeping, by a user equipment (UE), a first dual connectivity (DC) configuration in a wireless communication system, the method comprising:
   receiving, from a network, information for validation of a DC configuration, wherein the DC configuration includes the first DC configuration and a second DC configuration;
   determining whether or not the first DC configuration is valid in a radio resource control (RRC) resume procedure, based on the information for validation of the DC configuration;
   based on the first DC configuration that is valid, keeping the first DC configuration in an RRC resume procedure;
   releasing the second DC configuration before initiating the RRC resume procedure; and
   transmitting, to the network, a message for RRC resume request which includes information regarding whether or not the first DC configuration is kept.

2. The method of claim 1, wherein the information for validation of the DC configuration includes at least one cell in which the first DC configuration is valid.

3. The method of claim 2, wherein the first DC configuration is valid in the RRC resume procedure, based on the UE that is in the at least one cell in which the first DC configuration is valid.

4. The method of claim 2, wherein the first DC configuration is an entire master cell group (MCG) configuration, and the second DC configuration is an entire secondary cell group (SCG) configuration.

5. The method of claim 2, wherein the first DC configuration is an entire SCG configuration, and the second DC configuration is an entire MCG configuration.

6. The method of claim 2, wherein the first DC configuration is a dual connectivity configuration for at least one cell in a MCG or a SCG.

7. The method of claim 1, wherein the information for validation of the DC configuration includes a cell quality threshold in which the first DC configuration is valid.

8. The method of claim 7, wherein the first DC configuration is valid in the RRC resume procedure, based on quality of a cell to which the UE belongs that is greater than or equal to the cell quality threshold.

9. The method of claim 8, wherein the first DC configuration is one of an entire MCG configuration, an entire SCG configuration, a DC configuration for at least one SCell in a MCG or a DC configuration for at least one cell in a SCG.

10. The method of claim 7, wherein the first DC configuration is an entire MCG configuration, and the cell quality threshold is for the entire MCG configuration, and
    wherein the entire MCG configuration is valid in the RRC resume procedure, based on quality of all cells in a MCG that is greater than or equal to the cell quality threshold.

11. The method of claim 1, wherein the information for validation of the DC configuration includes a validity time duration in which the DC configuration is valid.

12. The method of claim 11, wherein the first DC configuration is valid in the RRC resume procedure, during the validity time duration.

13. The method of claim 1, further comprising:
    based on the first DC configuration that is not valid, releasing the first DC configuration and the second DC configuration before initiating the RRC resume procedure.

14. A user equipment (UE) configured to operate in a wireless communication system, the UE comprising:
    a transceiver;
    a processor; and
    a computer-readable memory operably connected to the processor and storing instructions that, based on being executed by the processor, perform operations comprising:
    receiving, from a network through the transceiver, information for validation of a dual connectivity (DC) configuration, wherein the DC configuration includes a first DC configuration and a second DC configuration;
    determining whether or not the first DC configuration is valid in a radio resource control (RRC) resume procedure, based on the information for validation of the DC configuration;
    based on the first DC configuration that is valid, keeping the first DC configuration in an RRC resume procedure;
    releasing the second DC configuration before initiating the RRC resume procedure; and
    transmitting, to the network through the transceiver, a message for RRC resume request which includes information regarding whether or not the first DC configuration is kept.

15. The UE of claim 14, wherein the information for validation of the DC configuration includes at least one cell in which the first DC configuration is valid.

16. The UE of claim 15, wherein the first DC configuration is valid in the RRC resume procedure, based on the UE that is in the at least one cell in which the first DC configuration is valid.

17. The UE of claim 15, wherein the first DC configuration is an entire master cell group (MCG) configuration, and the second DC configuration is an entire secondary cell group (SCG) configuration.

18. The UE of claim 15, wherein the first DC configuration is an entire SCG configuration, and the second DC configuration is an entire MCG configuration.

19. The UE of claim 15, wherein the first DC configuration is a dual connectivity configuration for at least one cell in a MCG or a SCG.

20. The UE of claim 14, wherein the information for validation of the DC configuration includes a cell quality threshold in which the first DC configuration is valid.

* * * * *